(12) United States Patent  
Kondo

(10) Patent No.: US 7,466,463 B2  
(45) Date of Patent: Dec. 16, 2008

(54) COLOR CONVERSION DEFINITION CORRECTION APPARATUS, AND COLOR CONVERSION DEFINITION CORRECTION PROGRAM STORAGE MEDIUM

(75) Inventor: Hirokazu Kondo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 953 days.

(21) Appl. No.: 10/424,770

(22) Filed: Apr. 29, 2003

(65) Prior Publication Data

US 2003/0214661 A1 Nov. 20, 2003

(30) Foreign Application Priority Data

May 15, 2002 (JP) ............................. 2002-140459

(51) Int. Cl.
*H04N 1/60* (2006.01)
*H04N 1/54* (2006.01)
*H04N 17/00* (2006.01)
*H04N 5/911* (2006.01)
*G03F 3/00* (2006.01)

(52) U.S. Cl. ....................... 358/504; 358/518; 358/525; 358/463; 358/3.27; 382/167; 345/601; 345/603; 345/604; 345/606

(58) Field of Classification Search ................. 358/504, 358/3.27, 518, 525, 463; 345/601, 603, 604, 345/606; 382/167
See application file for complete search history.

(56) References Cited

U.S. PATENT DOCUMENTS

| | | | | |
|---|---|---|---|---|
| 4,658,286 A * | 4/1987 | Schwartz et al. | ............ | 348/179 |
| 4,941,039 A * | 7/1990 | E'Errico | ..................... | 358/518 |
| 5,241,373 A * | 8/1993 | Kanamori et al. | ........... | 348/645 |
| 5,418,574 A * | 5/1995 | Miyabata et al. | ............ | 348/625 |
| 5,481,380 A * | 1/1996 | Bestmann | .................... | 358/504 |
| 5,489,921 A * | 2/1996 | Dorff et al. | ................. | 345/604 |
| 5,583,666 A * | 12/1996 | Ellson et al. | ................ | 358/518 |
| 5,751,845 A * | 5/1998 | Dorff et al. | ................. | 382/162 |
| 5,902,052 A * | 5/1999 | Hayashi | ................. | 400/120.02 |
| 6,100,999 A * | 8/2000 | Ikegami | ...................... | 358/1.9 |
| 6,160,912 A * | 12/2000 | Usami | ........................ | 382/167 |
| 6,215,561 B1 * | 4/2001 | Kakutani | .................... | 358/1.9 |
| 6,324,975 B1 * | 12/2001 | Kondo | ........................ | 101/171 |

(Continued)

FOREIGN PATENT DOCUMENTS

JP 2000-050090 A 2/2000

(Continued)

*Primary Examiner*—David K. Moore
*Assistant Examiner*—Beniyam Menberu
(74) *Attorney, Agent, or Firm*—Sughrue Mion, PLLC

(57) ABSTRACT

A color conversion definition correction apparatus corrects a color conversion definition defining a relation between first color data representative of a color by coordinates on a first color space and second color data representative of a color by coordinates on a second color space in such a manner that a plurality of first color data has a one-to-one correspondence with a plurality of second color data. A smoothing processing is applied to the second color data. A color difference between the reference color set up and a color represented by the second color data subjected to the smoothing processing is determined. The second color data subjected to the smoothing processing is corrected, when the color difference is larger than the reference color difference, in such a manner that a color difference between a color represented by the second color data and the reference color is small.

7 Claims, 10 Drawing Sheets

U.S. PATENT DOCUMENTS

| | | | |
|---|---|---|---|
| 6,362,808 B1 * | 3/2002 | Edge et al. | 345/601 |
| 6,594,388 B1 * | 7/2003 | Gindele et al. | 382/167 |
| 6,757,427 B1 * | 6/2004 | Hongu | 382/164 |
| 6,873,441 B1 * | 3/2005 | Kuwabara et al. | 358/3.26 |
| 7,064,866 B1 * | 6/2006 | Asada | 358/2.1 |
| 2002/0051158 A1 * | 5/2002 | Ohkubo | 358/1.9 |
| 2002/0054395 A1 * | 5/2002 | Kubo | 358/518 |
| 2002/0114513 A1 * | 8/2002 | Hirao | 382/167 |
| 2003/0053097 A1 * | 3/2003 | Ohga et al. | 358/1.9 |
| 2003/0081831 A1 * | 5/2003 | Fukao et al. | 382/167 |
| 2003/0090726 A1 * | 5/2003 | Arai | 358/2.1 |

FOREIGN PATENT DOCUMENTS

JP     2002-094820 A     3/2002

* cited by examiner

COLOR CONVERSION DEFINITION CORRECTION APPARATUS, AND COLOR CONVERSION DEFINITION CORRECTION PROGRAM STORAGE MEDIUM

BACKGROUND OF THE INVENTION

1. Field of the Invention

The present invention relates to a color conversion definition correction apparatus for correcting a color conversion definition defining a relation between first color data representative of a color by coordinates on a first color space and second color data representative of a color by coordinates on a second color space in such a manner that a plurality of first color data has a one-to-one correspondence with a plurality of second color data, and a color conversion definition correction program storage medium storing a color conversion definition correction program which causes a computer to operate as such a color conversion definition correction apparatus.

2. Description of the Related Art

Hitherto, it is performed that image data is obtained in such a manner that an input device such as a color scanner and an electronic still camera is used to read an image (here, referred to as an original image), and reproduction image is obtained in such a manner that an output device such as a printing machine, a printer and a display is used to reproduce the original image in accordance with the image data thus obtained. In this case, there are determined a color conversion definition (an input profile) associating a color on the original image with a color representation on the image data, according to the input device, and a color conversion definition (an output profile) associating the color representation on the image data with a color on the reproduction image, according to the output device such as a printing machine and a printer, and the image data obtained by the input device through the original image is converted into image data adapted for the output device in accordance with a combined color conversion definition (a device link profile) of both the color conversion definitions (the input profile and the output profile), so that a reproduction image is outputted in the image data for the output device. In this manner, it is possible to obtain a reproduction image greatly close to the original image in color.

This is applicable between output device-to-output device too. Next, examples will be explained.

Hitherto, when a printing machine is used to perform a color image printing, it is performed prior to the color image printing that a color printer and the like is used to create a proof image which is extremely similar in color to an image to be printed in the printing machine. When the color printer and the like is used to create the proof image, the proof image is created in such a manner that detected are a color conversion definition (a printing profile) defining an association of color data representative of dot % of for example, C (cyan), M (magenta), Y (yellow), and K (black), for a printing machine of interest, with a color of the actual printed matter outputted in accordance with the color data, and a color conversion definition (a printer profile) defining an association of color data representative of dot % of for example, CMYK, for a printer for a proofer image to be outputted, with a color of the proof image to be actually printed out in accordance with the color data, and image data for printing is converted into image data for a printer in accordance with a combined color conversion definition (a device link profile) of the printing profile and the printer profile, so that the proof image is created in accordance with the image data for a printer thus converted. In this manner, it is possible to create a proof image greatly close to the actual printed matter in color.

In order to obtain an image matched in color in accordance with the manner as mentioned above, there is a need to exactly determine the color conversion definition (the input profile) of the input device such as a color scanner and an electronic still camera, and the color conversion definition (the output profile) of the output device such as a printing machine and a printer.

When the color conversion definition (the profile) is determined, for example, in case of an input device, the input de-vice is used to read a color chart in which color patches are arranged, so as to convert it into image data, and coordinates (CMYK values or RGB values) of a color space (a device-dependence color space: for example, a CMYK color space consisting of four colors of C, M, Y and K, or an RGB color space consisting of three colors of R (red), C (green) and B (blue)) on the image data are determined. And in addition, a spectrocolorimeter is used to measure the color patches constituting the color chart, so that colorimetric values (L*a*b* values or XYZ values) of a colorimetric color space (a device non-dependence color space: for example, an L*a*b* color space or an XYZ color space) are determined. And thus, the coordinates on the device-dependence color space are associated with the calorimetric values on the device non-dependence color space.

The color conversion definition (the output profile) of the output device is determined in such a manner that image data corresponding to a color chart in which color patches associated with a plurality of sorts of color data sequentially varied in dot %, for example, such as 0%, 10%, . . . , 100%, on each of four colors of CMYK, are arranged, is created; the output device outputs the color chart in accordance with the image data; a spectrocolorimeter is used to measure the color patches constituting the color chart thus outputted; and coordinates of a color space (the device-dependence color space) on the image data thus obtained are associated with the colorimetric values of a calorimetric color space (the device non-dependence color space).

The color conversion definitions (the profiles) can be basically determined in the manner as mentioned above. However, the number of color patches constituting a color chart is not so many in such an extent that it corresponds to the number of color conversion definitions (the profiles), and thus the above-mentioned association is associated with thin coordinates which are considerably rough on a color space basis. This is too rough as the color conversion definitions (the profiles). Accordingly, finally, a desired color conversion definition (a profile) is created in such a manner that a number of pairs of association between the coordinates of a color space (the device-dependence color space) on the image data and the calorimetric values of a calorimetric color space (the device non-dependence color space) is increased by interpolation arithmetic operation and the like in accordance with the association between the coordinates of a color space (the device-dependence color space) on the image data and the calorimetric values of a colorimetric color space (the device non-dependence color space), which is obtained by colorimetry of the color patches constituting the color chart in the manner as mentioned above.

However, even if the color conversion definitions (the profiles) for the input device and the output device are determined in the manner as mentioned above, a measurement error by a spectrocolorimeter, a color error of a color patch due to the property (for example, a position dependency of an output color) of a device of interest as an object intended to create the associated color conversion definition (the profile), and adding color patches of a specified important color such as a skin color as color patches constituting a color chart in order to enhance practical color matching accuracy, will cause a distortion on the created color conversion definition (the profile). This will bring about noises destroying monotonicity of variations of L*a*b* data and XYZ data associated with the monotonous coordinate variation on the device-dependence color space.

FIG. 11 is a view showing an example of a color conversion definition (a TARGET device profile) including noises destroying monotonicity of variations of data. The horizontal axis denotes dot % for M (gradation in which a density of a color continuously varies from Y to R) to 100% of dot % for Y. The vertical axis denotes variations of L*a*b* values resulting from variations of dot % for M.

According to the example shown in FIG. 11, the monotonicity of variations of L*a*b* values to the monotonic variations of dot % for M is destroyed by noises included in the color conversion definition (target device profile), so that a slope is greatly varied.

FIG. 12 is a view showing an example of a color conversion definition (a device link profile) including noises destroying monotonicity of variations of data. Here, let us take notice of C and M. The horizontal axis denotes dot % for an input device (gradation in which a density of a color continuously varies from C to M). The vertical axis denotes variation quantity of dot % for an output device to variations of dot % for the input device.

According to the example shown in FIG. 12, there is varied the variation quantity of dot % for the output device, owing to noises included in the color conversion definition (the device link profile), to the monotonic variations of dot % for the input device in which dot % for C is monotonically varied from 100% to 0%, and dot % for M is monotonically varied from 0% to 100%.

Inclusion of the noises as shown in FIG. 11 and FIG. 12 in the created color conversion definition (the profile) would cause discontinuous variations in density of a color (hereinafter, the discontinuous variations in the image density will be referred to as a tone jump), in the event that this color conversion definition (the profile) is used to perform a color conversion, on a portion of gradation in which density of a color is continuously varied, on a color image outputted in accordance with image data after color conversion. And thus the tone jump is visually recognized. This causes a possibility that image quality of the outputted color image is degraded. Further, when it is intended to determine through a computation a reverse conversion profile for determining coordinates of a color space (a device-dependence color space) on image data from calorimetric values of a calorimetric color space (a device non-dependence color space) in accordance with the created color conversion definition (the profile), there is a possibility that the reverse conversion profile cannot be determined exactly because noises included in the color conversion definition (the profile) become a computing error main cause.

It is known that an application of a smoothing processing to a color conversion definition (a profile) including noises destroying such monotonicity makes it possible to ease distortion of the color conversion definition.

FIG. 13 is a view showing an example of a color conversion definition (a target device profile) after the smoothing processing to the color conversion definition (the target device profile) shown in FIG. 11. In a similar fashion to that of FIG. 11, the horizontal axis denotes dot % for M (gradation in which a density of a color continuously varies from Y to R) to 100% of dot % for Y. The vertical axis denotes variations of L*a*b* values resulting from variations of dot % for M.

According to the example shown in FIG. 13, it is eased that a slope of L*A*a*b* values is greatly varied to a monotonic variation of dot % for M.

FIG. 14 is a view showing an example of a color conversion definition (a device link profile) after the smoothing processing to the color conversion definition (the device link profile) shown in FIG. 12. In a similar fashion to that of FIG. 12, here, let us take notice of C and M. The horizontal axis denotes dot % for an input device (gradation in which a density of a color continuously varies from C to M). The vertical axis denotes variation quantity of dot % for an output device to variations of dot % for the input device.

According to the example shown in FIG. 14, there is eased dispersion of variation quantity of dot % for an output device to monotonic variations of dot % for the input device.

When the color conversion definitions (the profiles) after the smoothing processing, as shown in FIGS. 13 and 14, are used to perform a color conversion, the tone jump is eased so that a smooth gradation is expressed, and thus it is possible to output a color image having a high color quality.

However, an application of the smoothing processing to the profile causes data of the profile to vary. And thus there is a possibility that accuracy of the color matching is decreased.

SUMMARY OF THE INVENTION

In view of the foregoing, it is an object of the present invention to provide a color conversion definition correction apparatus capable of coping with both the color matching accuracy and the continuity of density on a high dimensional basis, and a color conversion definition correction program storage medium storing a color conversion definition correction program which causes a computer to operate as such a color conversion definition correction apparatus.

To achieve the above-mentioned object, the present invention provides a color conversion definition correction apparatus for correcting a color conversion definition defining a relation between first color data representative of a color by coordinates on a first color space and second color data representative of a color by coordinates on a second color space in such a manner that a plurality of first color data has a one-to-one correspondence with a plurality of second color data, the color conversion definition correction apparatus comprising:

a smoothing processing section that applies to a plurality of second color data in the color conversion definition a smoothing processing for smoothing discontinuity among the plurality of second color data so as to correct the color conversion definition;

a reference color set up section that sets up a reference color to the second color data in the color conversion definition;

a color difference arithmetic operation section that determines a color difference between the reference color set up by the reference color set up section and a color represented by the second color data subjected to the smoothing processing by the smoothing processing section;

a reference color difference set up section that sets up an arbitrary reference color difference; and a color data correction section that corrects the second color data subjected to the smoothing processing by the smoothing processing section, when the color difference determined by the color difference arithmetic operation section is larger than the reference color difference set up by the reference color difference set up section, in such a manner that a color difference between a color represented by the second color data and the reference color is small.

According to the color conversion definition correction apparatus of the present invention, to correct the color conversion definition, a smoothing processing is applied to the second color data. A color difference between the reference color set up and a color represented by the second color data subjected to the smoothing processing is determined. The second color data subjected to the smoothing processing is corrected, when the color difference is larger than the reference color difference, in such a manner that a color difference between a color represented by the second color data and the reference color is small. Thus, according to the present invention, it is possible to prevent an accuracy of color matching from being greatly lowered owing to the application of the smoothing processing, and thereby maintaining a predetermined color matching accuracy and easing a discontinuity of density. Therefore, according to the color conversion definition correction apparatus of the present embodiment, it is possible to implement coping with both the color matching accuracy and the continuity of density on a high dimensional basis.

In the color conversion definition correction apparatus according to the present invention as mentioned above, it is preferable that the reference color set up section is adapted, as setting up of the reference color, to receive a selection of data from the second color data before an application of the smoothing processing by the smoothing processing section.

Set up of the reference color by a selection of data from the second color data before an application of the smoothing processing makes it easy to set up the reference color.

Alternatively, in the color conversion definition correction apparatus according to the present invention as mentioned above, it is preferable that the reference color set up section is adapted, as setting up of the reference color, to receive an input of color data representative of the reference color.

In the event that the reference color is set up by an input of color data representative of a color not included in the color chart, for example, a specific skin color and the like, it is possible to maintain practical color matching with greater accuracy and ease a discontinuity of density.

Further, to achieve the above-mentioned object, the present invention provides a color conversion definition correction program storage medium storing a color conversion definition correction program which causes a computer to operate as a color conversion definition correction apparatus for correcting a color conversion definition defining a relation between first color data representative of a color by coordinates on a first color space and second color data representative of a color by coordinates on a second color space in such a manner that a plurality of first color data has a one-to-one correspondence with a plurality of second color data, when the color conversion definition correction is incorporated into the computer and executed, the color conversion definition correction program comprising:

a smoothing processing section that applies to a plurality of second color data in the color conversion definition a smoothing processing for smoothing discontinuity among the plurality of second color data so as to correct the color conversion definition;

a reference color set up section that sets up a reference color to the second color data in the color conversion definition;

a color difference arithmetic operation section 313 that determines a color difference between the reference color set up by the reference color set up section and a color represented by the second color data subjected to the smoothing processing by the smoothing processing section;

a reference color difference set up section that sets up an arbitrary reference color difference; and a color data correction section that corrects the second color data subjected to the smoothing processing by the smoothing processing section, when the color difference determined by the color difference arithmetic operation section is larger than the reference color difference set up by the reference color difference set up section, in such a manner that a color difference between a color represented by the second color data and the reference color is small.

The color conversion definition correction program, which is stored in the color conversion definition correction program storage medium, causes a computer to operate as such a color conversion definition correction apparatus when it is installed in the computer and operated. The color conversion definition correction program storage medium storing the color conversion definition correction program includes all the aspects corresponding to all the aspects of the color conversion definition correction apparatus of the present invention.

In the color conversion definition correction apparatus and the color conversion definition correction program stored in the color conversion definition correction program storage medium according to the present invention, as to names for the structural elements of those, the same names are applied. It is noted, however, that in case of the color conversion definition correction program, only the software is concerned, and in case of the color conversion definition correction apparatus, the hardware and the software are concerned.

DETAILED DESCRIPTION OF PREFERRED EMBODIMENTS

Embodiments of the present invention will be described with reference to the accompanying drawings.

In the present embodiment, there will be explained an example for correcting a profile that is an example of the color conversion definition referred to in the present invention, for providing a coincidence or sufficient approximation of a color on a proof image to be printed out by a printer with a color on a printed matter obtained by a printing machine.

Figure 1:
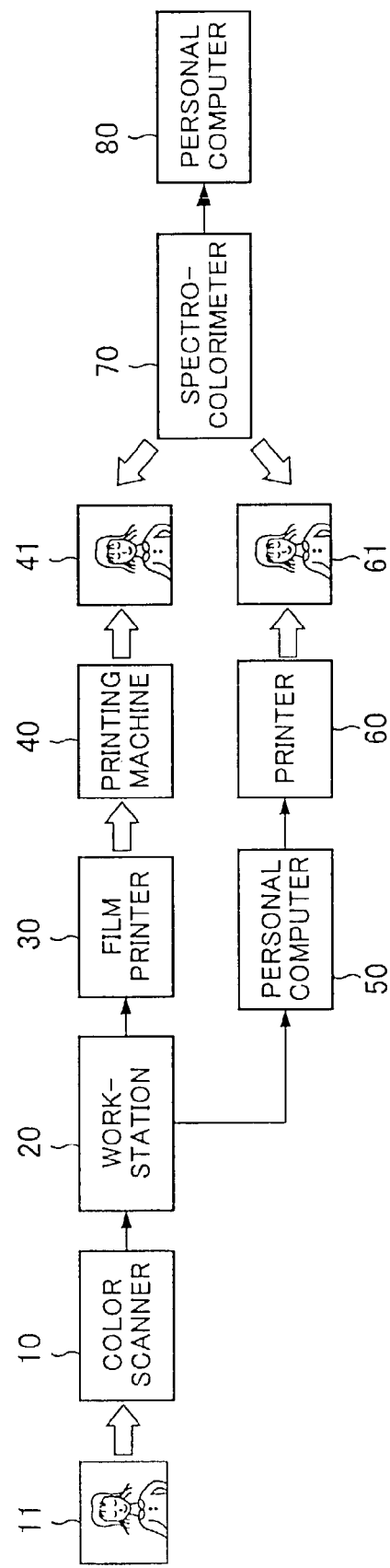
FIG. 1 is a construction view of a printing and proof image creating system in which a profile to be corrected in accordance with an embodiment of the present invention is adopted.

FIG. 1 is a construction view of a printing and proof image creating system in which a profile to be corrected in accordance with an embodiment of the present invention is adopted. Here, first, there will be explained a position of the present invention referring to FIG. 1.

A color scanner 10 reads an original image 11 to generate color separation image data for four colors of C (cyan), M (magenta), Y (yellow), K (black) representative of the original image 11. The color separation image data for CMYK is fed to a workstation 20. In the workstation 20, an operator performs an electronic page make-up in accordance with fed image data to generate image data representative of an image for printing. The image data for printing is fed to a film printer 30 when the printing is performed. The film printer 30 creates film original plates for printing for CMYK in accordance with the fed image data.

From the film original plates for printing, machine plates are created, and the machine plates thus created are loaded onto a printing machine 40. Ink is applied to the machine plates loaded onto the printing machine 40. The applied ink is transferred to a paper for printing to form a printed image 41 on the paper.

A series of work that the film printer 30 is used to create the film original plates, a machine plate is created and is loaded onto the printing machine 40, and ink is applied to the machine plate to perform a printing on a sheet, is a large-scale work, and it costs a great deal. For this reason, prior to the actual printing work, a printer 60 is used to create a proof image 61 in accordance with a manner as set forth below, so that finish of the printed image 41 is confirmed beforehand.

When the proof image 61 is created, the image data, which is created by the electronic page make-up on the workstation 20, is fed to a personal computer 50. Here, the image data fed to the personal computer 50 is description language data described in a so-called PDL (Page Description Language). In the personal computer 50, a so-called RIP (Raster Image Processor) is used to convert the received image data into image data for CMYK four colors developed into a bit map. The image data for CMYK four colors is substantially same as the image data for printing fed to the film printer 30.

A spectrocolorimeter 70 and a personal computer 80 shown in FIG. 1 are associated with creation and correction of the profile, and constitute the color conversion definition correction apparatus referred to in the present invention. The personal computer 50 stores a profile having a format of LUT (Look Up Table) created and corrected beforehand using the personal computer 80. The image data for CMYK four colors for printing is converted into image data for CMYK four colors suitable for the printer 60, while the profile is referred to in the personal computer 50. The printer 60 receives the image data for CMYK four colors for the printer to create a proof image 61 in accordance with the received image data for CMYK four colors for the printer.

A degree of color matching between the image 41 obtained through printing by the printing machine 40 and the proof image 61 obtained by the printer 60 is determined by the profile in the personal computer 50. This profile is created for each printer and for each printing condition.

While FIG. 1 shows only one printing machine, it is acceptable that there exists a plurality of printing machines. Alternatively, it is acceptable that even if only one printing machine is concerned, there exists a plurality of printing conditions. Thus, the profile is created individually in accordance with each of a plurality of printing conditions including a difference of printing machines. In other words, the profile is created individually in accordance with a combination of each of the printing conditions and each of the printers (when only one printer is concerned and a plurality of print conditions exists, each of the print conditions). Incidentally, there will be described later a creating method of the profile.

Confirmation of the proof image thus created makes it possible to predict finish of printing beforehand.

A feature of the embodiment of the present invention in the printing and proof image creating system shown in FIG. 1 relates to processing contents to be executed in the personal computer 80. Accordingly, hereinafter, there will be explained the personal computer 80.

Figure 2:
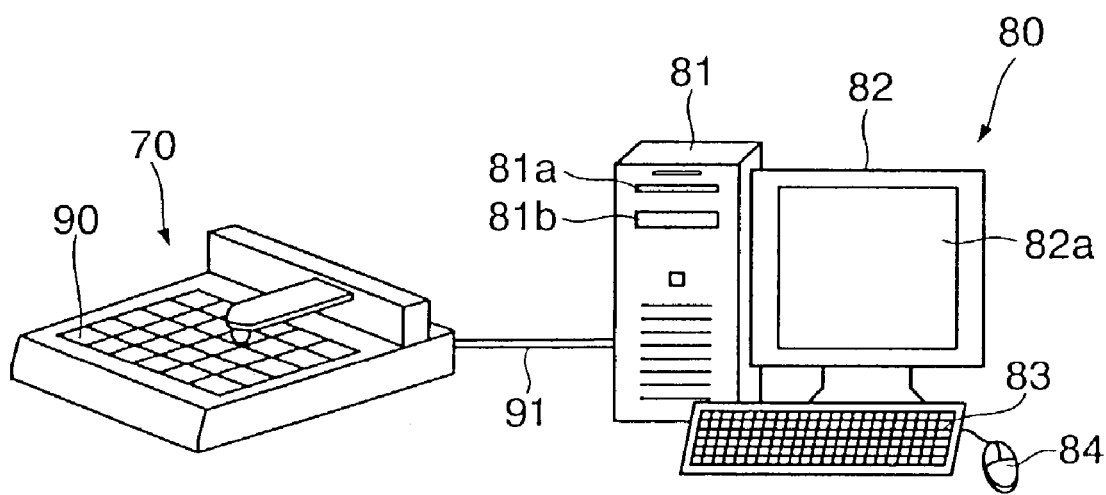
FIG. 2 is a perspective view of a spectrocolorimeter shown in FIG. 1 in block and a personal computer constituting an embodiment of a color conversion definition correction apparatus of the present invention.
Figure 3:
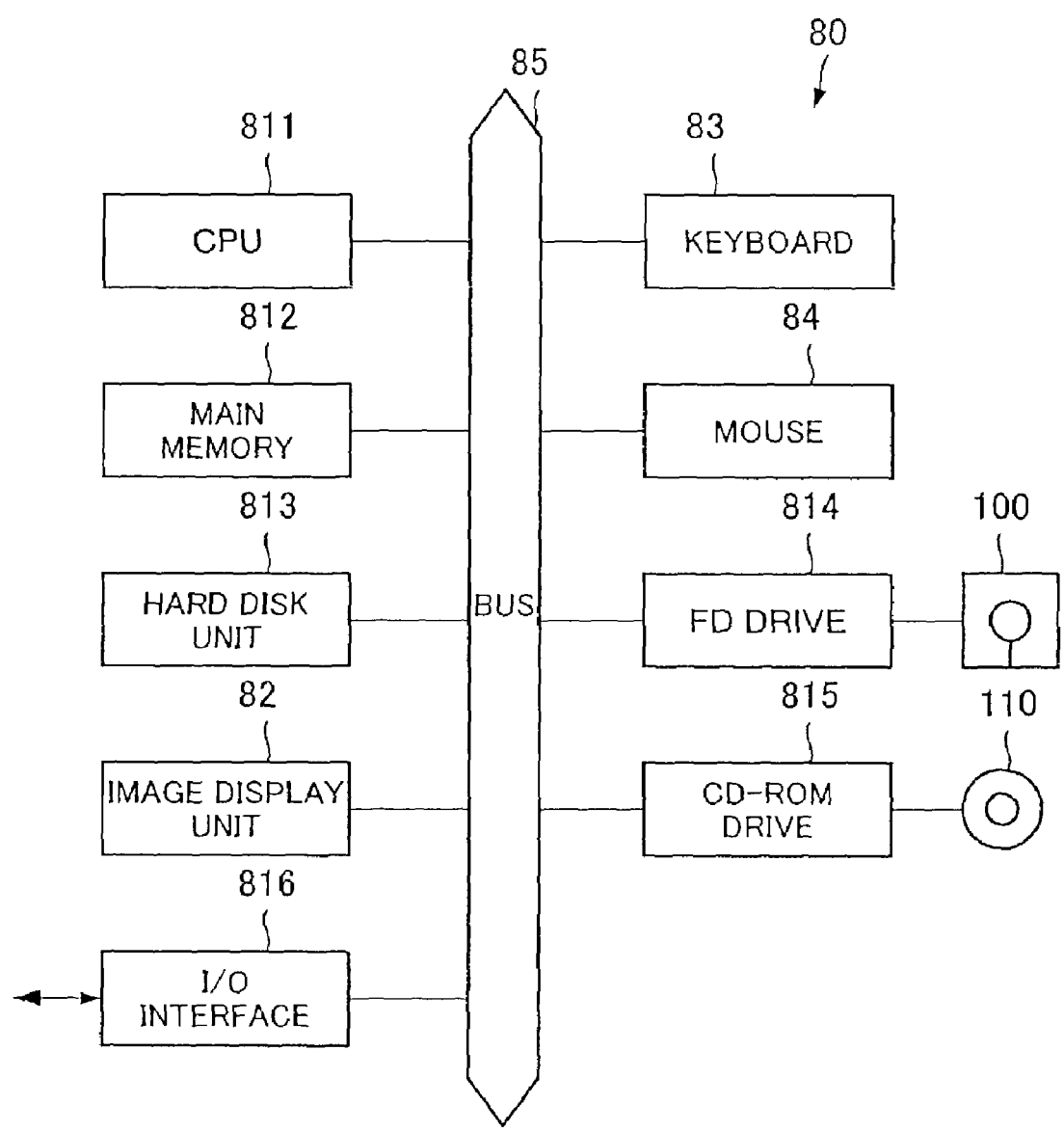
FIG. 3 is a hardware structural view of the personal computer shown in FIG. 2.

FIG. 2 is a perspective view of the spectrocolorimeter 70 shown in FIG. 1 in block and the personal computer 80 constituting an embodiment of a color conversion definition correction apparatus of the present invention. FIG. 3 is a hardware structural view of the personal computer 80.

Here, an embodiment of a color conversion definition correction apparatus of the present invention comprises hardware and OS (Operation System) of the personal computer 80, and a color conversion definition correction program that is installed in the personal computer 80 to be executed.

The spectrocolorimeter 70 shown in FIG. 2 is loaded with a color chart 90 in which a plurality of color patches is arranged, so that calorimetric values (L*a*b*) on the plurality of color patches constituting the color chart 90 are measured. Colorimetric data representative of the calorimetric values of the color patches obtained through measurement by the spectrocolorimeter 70 is fed via a cable 91 to the personal computer 80.

The color chart 90 is created by printing with the printing machine 40 shown in FIG. 1, or by printing output with the printer 60. The personal computer 80 recognizes color data (coordinates on a device color space: values for CMYK or RGB) associated with the color patches constructing the color chart 90, and creates a printing profile and a printer profile in accordance with color data for the respective color patches of the color chart 90 and the calorimetric data obtained by the spectrocolorimeter 70. Details of this respect will be explained later. Next, there will be explained a hardware structure of the personal computer 80.

As shown in FIG. 2, the personal computer 80 comprises, on an external appearance, a main frame unit 81, an image display unit 82 for displaying an image on a display screen 82a in accordance with an instruction from the main frame unit 81, a keyboard 83 for inputting various sorts of information to the main frame unit 81 in accordance with a key operation, and a mouse 84 for inputting an instruction according to, for example, an icon and the like, through designation of an optional position on the display screen 82a, the icon and the like being displayed on the position on the display screen 82a. The main frame unit 81 has a flexible disk (FD) mounting slot 81a for mounting a flexible disk (FD), and a CD-ROM mounting slot 81b for mounting a CD-ROM.

The main frame unit 81 comprises, as shown in FIG. 3, a CPU 811 for executing a various types of program, a main memory 812 in which a program stored in a hard disk unit 813 is read out and developed for execution by the CPU 811, the hard disk unit 813 for saving various types of programs and data, an FD drive 814 for accessing a flexible disk 100 mounted thereon, a CD-ROM drive 815 for accessing a CD-ROM 110 mounted thereon, and an I/O interface 816 connected to the spectrocolorimeter 70 (cf. FIG. 1 and FIG. 2) to receive calorimetric values from the spectrocolorimeter 70. These various types of elements are connected via a bus 85 to the image display unit 82, the keyboard 83 and the mouse 84.

The CD-ROM 110 stores therein a color conversion definition correction program, which causes the personal computer 80 to operate as a color conversion definition correction apparatus. The CD-ROM 110 is mounted on the CD-ROM drive 815 so that the color conversion definition correction program, which is stored in the CD-ROM 110, is up-loaded on the personal computer 80 and is stored in the hard disk unit 813.

Incidentally, a function of the creation of the profile by the personal computer 80, which will be described later, is not the subject of the present invention. It is assumed that program and the like necessary for implementing the function are already installed in the personal computer 80.

Next, there will be explained a creating function of a profile constructed in the personal computer 80.

Generally, a printer profile, which will be described hereinafter, is already created by a maker of a printer, and is delivered together with the printer. Accordingly, here, while there is no need to create the printer profile newly, hereinafter, there will be explained a basic creating method wherein the printer profile is newly created.

Figure 4:
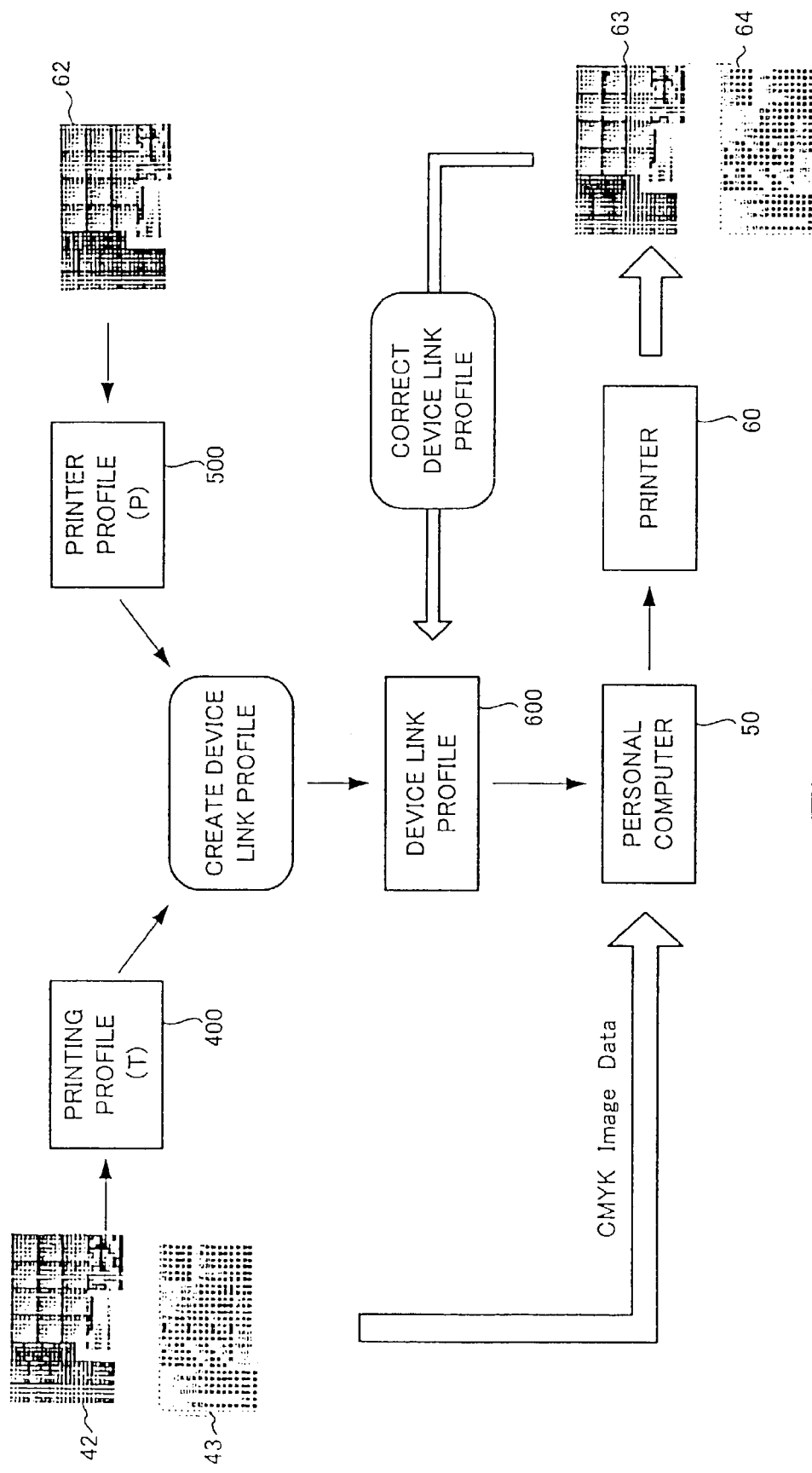
FIG. 4 is an explanatory view useful for understanding creation and correction for a profile.

FIG. 4 is an explanatory view useful for understanding creation and correction for a profile.

A correction for a profile referred to here is for enhancing accuracy of a color matching in the color conversion based on the created profile, and is different from the "correction of a color conversion definition" referred to in the present invention.

First, there will be explained a method of creating a printing profile.

In the workstation 20 shown in FIG. 1, dot % data for CMYK four colors, sequentially varied, for example, at intervals of 0%, 10%, . . . 100%, is generated, and a color chart 42 based on dot % data thus generated is created in accordance with the above-mentioned printing procedure. The spectrocolorimeter 70 (cf. FIG. 2) is used to measure the color patches, which constitute the color chart 42. In this manner, there is obtained the association between CMYK values on a color space for CMYK four colors and L*a*b* values on an L*a*b* color space.

The association thus obtained is the association between CMYK values and L*a*b* values on coordinate points at rather rough intervals on the CMYK color space, since there is a limit in the number of color patches constituting a color chart. For this reason, after the association is obtained, interpolation arithmetic operation and the like are applied to the association to create a printing profile 400 in which there is defined the association as to coordinate points at desired fine intervals on a CMYK color space.

Figure 5:
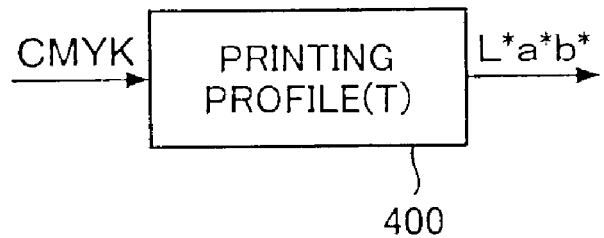
FIG. 5 is a conceptual view of a printing profile.

FIG. 5 is a conceptual view of the printing profile 400.

The printing profile 400 shown in FIG. 5 receives image data defined by CMYK to convert the received image data for CMYK into image data defined by L*a*b*. Here, the printing profile 400 for converting image data defined by CMYK into image data defined by L*a*b* is represented by T.

Next, there will be explained a method of creating a printer profile.

A method of creating the printer profile is the same as a method of creating the printing profile 400 excepting that an output device for outputting a color chart is a printer but not a printing machine. That is, here, the personal computer 50 shown in FIG. 1 is used to generate dot % data for CMYK four colors, sequentially varied, for example, at intervals of 0%, 10%, . . . , 100%. The dot % data thus generated is transmitted to the printer 60. The printer 60 prints out a color chart 63 in accordance with the dot %. Here, it is assumed that the printer 60 prints out the color chart 62 of the same type as the color chart 42 created through printing by the printing machine 40 for creation of the printing profile 400. The spectrocolorimeter 70 (cf. FIG. 2) is used to measure the color patches, which constitute the color chart 62. In this manner, there is obtained the association between CMYK values on a color space for CMYK four colors and L*a*b* values on an L*a*b* color space.

The association thus obtained is, similar to the case of a creation of the printing profile 400, the association between CMYK values and L*a*b* values on coordinate points at rather rough intervals on the CMYK color space, since there is a limit in the number of color patches constituting a color chart. For this reason, after the association is obtained, interpolation arithmetic operation and the like are applied to the association to create a printer profile 500 in which there is defined the association as to coordinate points at desired fine intervals on a CMYK color space.

Figure 6:
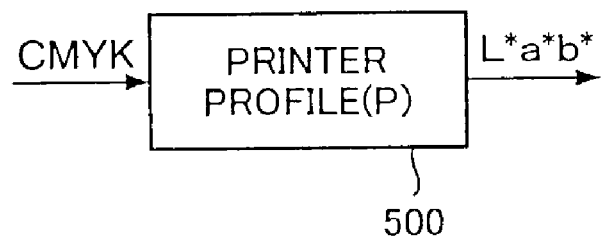
FIG. 6 is a conceptual view of a printer profile.

FIG. 6 is a conceptual view of a printer profile 500.

The printer profile 500 shown in FIG. 6 receives dot % data for CMYK to convert the received dot % data for CMYK into colorimetric data for L*a*b*. Here, the printer profile 500 (a forward transformation printer profile) for converting the dot % data for CMYK into the calorimetric data for L*a*b* is denoted by P, and reversely, a printer profile (a reverse transformation printer profile) for converting the calorimetric data for L*a*b* into the dot % data for CMYK is denoted by $P^{-1}$.

While it is explained that the printer 60 outputs an image in accordance with the dot % data for CMYK, also with respect to a printer for outputting an image according to data for RGB for instance, it is likely possible to create a printer profile suitable for the printer in such a manner that the personal computer 80 is used to generate data defined with an RGB space, and outputs a color chart.

Here, however, there will be explained the present embodiment wherein there is used the printer 60 for outputting an image in accordance with the dot % data for CMYK.

Figure 7:
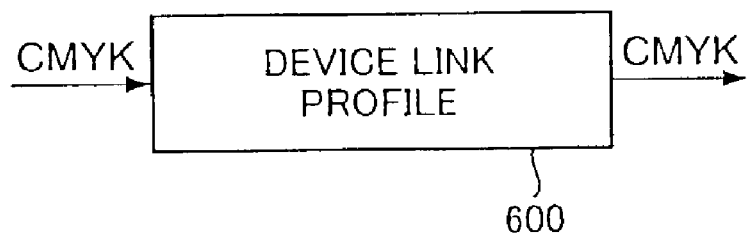
FIG. 7 is a view of a combined device link profile in which the printing profile shown in FIG. 5 is combined with the printer profile shown in FIG. 6.

FIG. 7 is a view of a combined device link profile 600 in which the printing profile 400 shown in FIG. 5 is combined with the printer profile 500 shown in FIG. 6.

The device link profile 600 consists of a combination of the printing profile 400 (T) and the reverse transformation printer profile ($P^{-1}$). According to the device link profile 600, there is implemented by one time of data conversion a result equivalent to a two-stage of conversion that dot % data for CMYK for printing is converted into calorimetric data for L*a*b* in accordance with the printing profile 400 (T), and reversely, the calorimetric data for L*a*b* is converted into the dot % data for CMYK for a printer in accordance with the reverse transformation printer profile ($P^{-1}$). That is, the device link profile 600 converts image data defined by the CMYK color space for printing into image data defined by the CMYK color space for a printer. The printer 60 can output a proof image having a color extremely similar to that of an image to be printed in accordance with the dot % data for CMYK for a printer created by the device link profile 600.

The personal computer 80, which constitutes the printing and proof image creating system, as shown in FIG. 1, is used to create the device link profile 600, and the device link profile 600 thus created is installed in the personal computer 50, which constitutes the printing and proof image creating system, as shown in FIG. 1, so that image data described in PDL fed from the workstation 20 is converted into image data of CMYK for printing. And thereafter, the image data of CMYK for printing is converted into image data of CMYK for a printer using the device link profile 600 so that the printer 60 prints out an image in accordance with the image data of CMYK for a printer. Thus, there is created a proof image extremely close in color to an image to be printed by the printing machine 40 shown in FIG. 1

Next, there will be described a method of correcting the device link profile 600 to enhance an accuracy of the color matching in a color conversion based on the device link profile 600.

A color chart 43 based on dot % data for CMYK four colors for printing, which is represented by a color chart wherein color patches including specified important colors such as skin color and the like (hereinafter, this color chart is referred to as an evaluating color chart), is created in accordance with the above-mentioned printing procedure. The color patches constituting the color chart 43 are measured by the spectrocolorimeter 70 (cf. FIG. 2).

Further, the device link profile 600 created in the manner as mentioned above is installed in the personal computer 50, which constitutes the printing and proof image creating system, as shown in FIG. 1, and dot % data for CMYK four colors for printing represented by the evaluating color chart is converted into image data of CMYK for printer using the device link profile 600 so that the printer 60 prints out a color chart 64 in accordance with the image data of CMYK for the printer. The color patches constituting the color chart 43 are measured by the spectrocolorimeter 70 (cf. FIG. 2).

When the device link profile 600 is corrected in accordance with a color difference between calorimetric values obtained through colorimetry of the color patches constituting the color chart 43 and calorimetric values obtained through colorimetry of the color patches constituting the color chart 64, it is possible to obtain the device link profile 600 enhanced in practical color matching with greater accuracy.

However, as described above, it may happen that measurement errors due to the spectrocolorimeter 70, color errors of color patches due to properties (for example, position dependency of an output color) of a device of interest for creation of the profile, and an addition of color patches of a specified important color such as a skin color as color patches constituting a color chart, for the purpose of enhancing a practical color matching accuracy, as correction of the device link profile 600 for enhancing a accuracy of a color matching in a color conversion based on the device link profile 600, would cause a distortion on a created profile, and thus the profile would include a noise destroying monotonicity of variations of data. When the created profile includes such a noise, the color conversion using the profile may bring about a discontinuity variation of density of color on a portion of a gradation wherein a density of a color is continuously varied, on a color image outputted in accordance with image data after color conversion (hereinafter, such a discontinuity variation of density of an image is referred to as a tone jump). The tone jump is recognized on a visual basis. Thus, there is a possibility that the tone jump brings about deterioration of image quality of the outputted color image. Further, when it is intended to determine through a computation a reverse transformation profile in which CMYK values on a color space for CMYK four colors are determined from L*a*b* values on a L*a*b* space in accordance with the created profile, there is a possibility that the reverse transformation profile cannot be determined exactly owing to the noises included in the profile.

It is known that an application of the abovementioned smoothing processing to the profile including noises destroying the monotonicity may ease a distortion of the profile. Thus, when the color conversion is performed using the profile subjected to the smoothing processing, the tone jump is eased so that smooth gradation can be expressed, and thereby outputting a color image having a high image quality on a color basis. However, an application of the smoothing processing to the profile serves to vary data of the profile, and thus there is a possibility that the smoothing processing causes an accuracy of the color matching to be degraded, although the device link profile 600 is corrected to enhance an accuracy of the color matching.

In view of the foregoing, next, there will be explained an embodiment of a color conversion definition correction according to the present invention coping with both the color matching accuracy and the continuity of density on a high-dimensional basis, which is implemented using the personal computer 80 shown in FIG. 1, FIG. 2, and FIG. 3.

Incidentally, a correction of a profile, which will be explained hereinafter, is an example of the "correction of a color conversion definition" referred to in the present invention.

Figure 8:
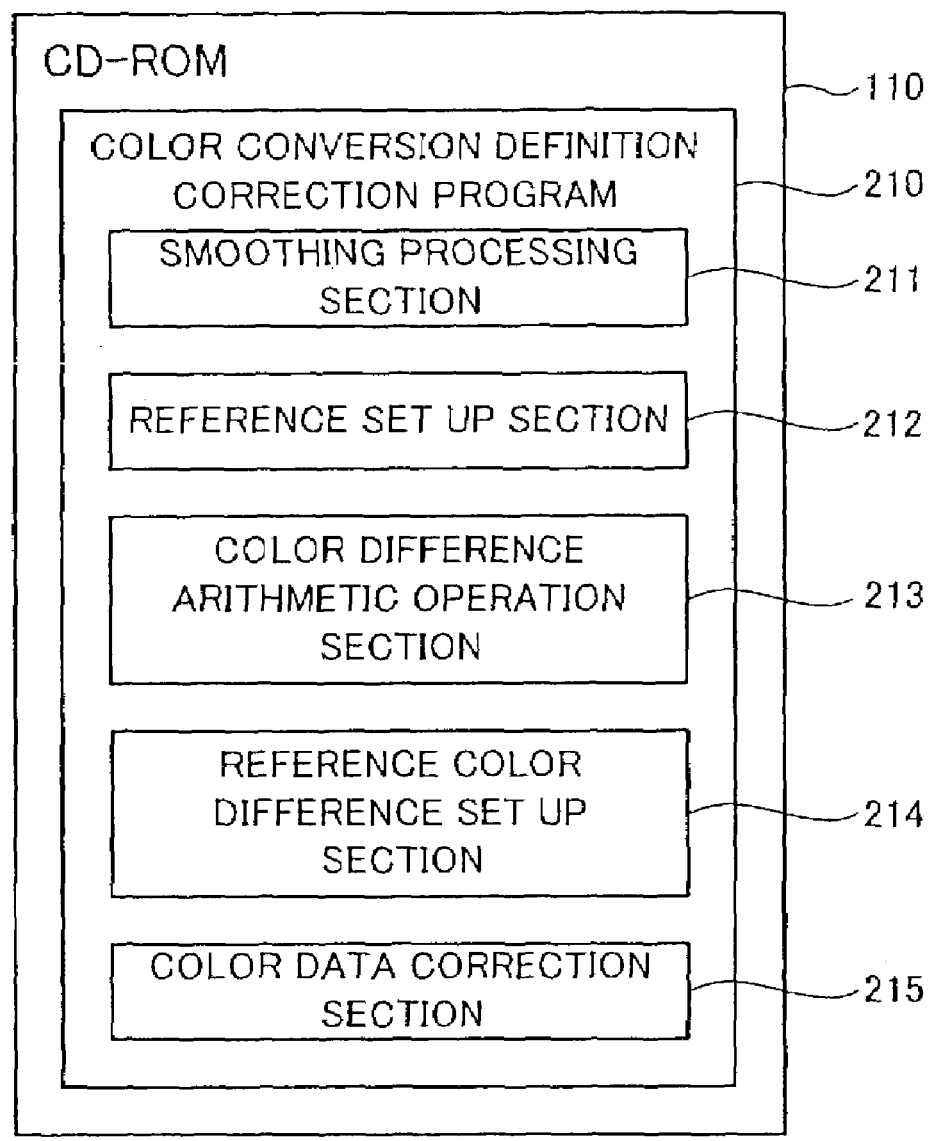
FIG. 8 is a view useful for understanding an embodiment of a color conversion definition correction program stored in a color conversion definition correction program storage medium of the present invention.

FIG. 8 is a view useful for understanding an embodiment of a color conversion definition correction program stored in a color conversion definition correction program storage medium of the present invention.

A color conversion definition correction program 210 shown in FIG. 8 is stored in the CD-ROM 110 shown in FIG. 3.

The color conversion definition correction program 210 is executed in the personal computer 80 shown in FIG. 1, FIG. 2, and FIG. 3. This program causes the personal computer 80 to operate as a color conversion definition apparatus for correcting a profile defining a relation of data conversion between CMYK values corresponding to an example of first color data representative of a color by coordinates on a first color space referred to in the present invention and L*a*b* values corresponding to an example of second color data representative of a color by coordinates on a second color space referred to in the present invention in such a manner that a plurality of CMYK values has a one-to-one correspondence with a plurality of L*a*b* values. The color conversion definition correction program 210 comprises a smoothing processing section 211, a reference color set up section 212, a color difference arithmetic operation section 213, a reference color difference set up section 214, and a color data correction section 215.

There will be described later functions of the respective elements of the color conversion definition correction program 210.

Figure 9:
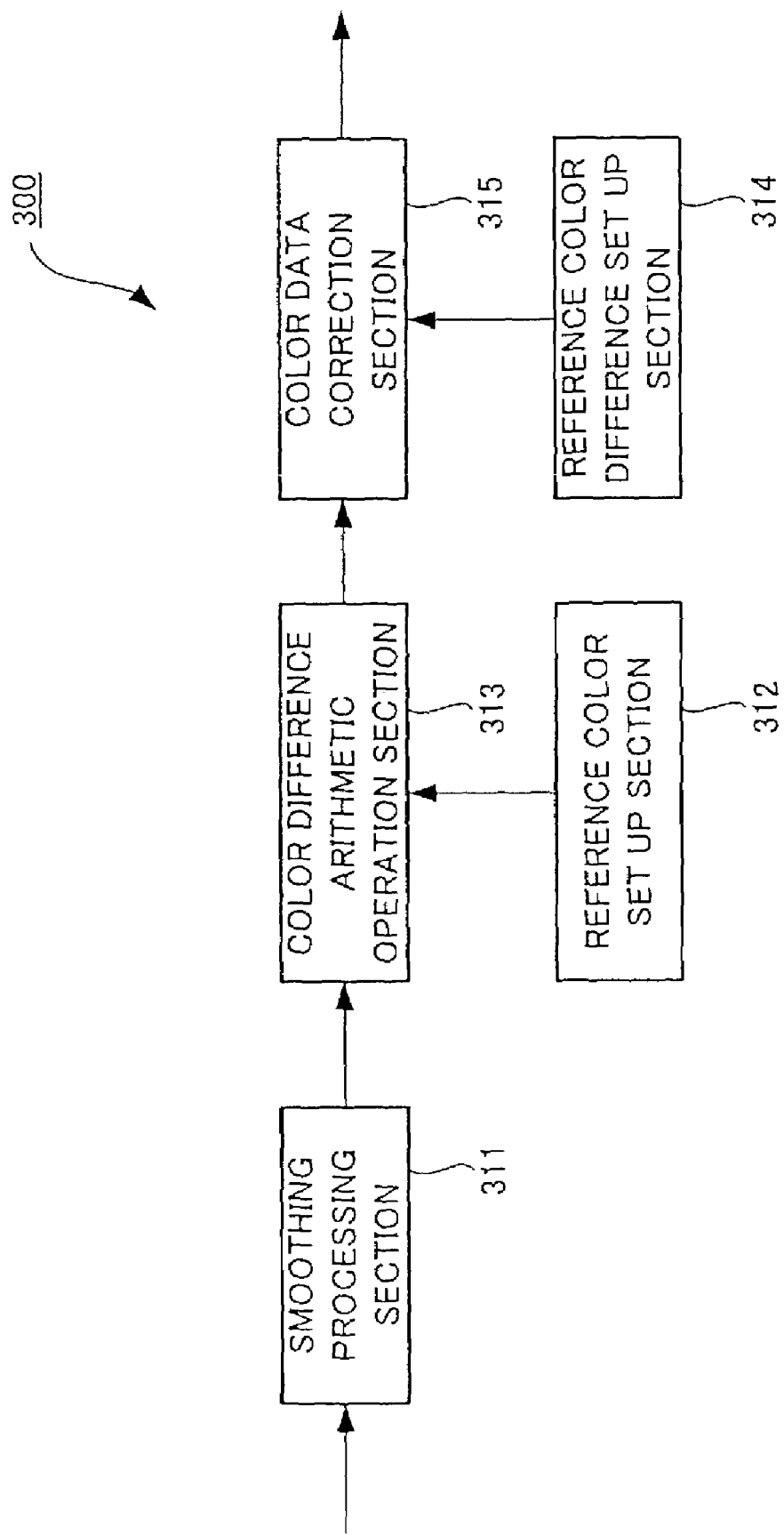
FIG. 9 is a functional block diagram useful for understanding an embodiment of a color conversion definition correction apparatus of the present invention.

FIG. 9 is a functional block diagram useful for understanding an embodiment of a color conversion definition correction apparatus of the present invention.

A color conversion definition correction apparatus 300 shown in FIG. 9 is implemented when the color conversion definition correction program 210 shown in FIG. 8 is loaded onto the personal computer 80 shown in FIG. 1, FIG. 2, and FIG. 3, and is executed in the personal computer 80.

The color conversion definition correction apparatus 300 shown in FIG. 9 corrects a profile defining a relation of data conversion between the above-mentioned CMYK values and the above-mentioned L*a*b* values in such a manner that a plurality of CMYK values has a one-to-one correspondence with a plurality of L*a*b* values. The color conversion definition correction apparatus 300 comprises a smoothing processing section 311, a reference color set up section 312, a color difference arithmetic operation section 313, a reference color difference set up section 314, and a color data correction section 315.

The respective elements of the color conversion definition correction apparatus 300, that is, the smoothing processing section 311, the reference color set up section 312, the color difference arithmetic operation section 313, the reference color difference set up section 314, and the color data correction section 315, comprise combinations of the respective elements of the color conversion definition correction program 210 shown in FIG. 8 as software parts, that is, the smoothing processing section 211, the reference color set up section 212, the color difference arithmetic operation section 213, the reference color difference set up section 214, and the color data correction section 215, and a hardware and an OS (Operation System) of the personal computer 80 shown in FIG. 1, FIG. 2, and FIG. 3, which are necessary for implementing functions of the software parts, and an application program, respectively.

Hereinafter, there will be explained the respective elements of the color conversion definition correction apparatus 300 shown in FIG. 9. This explanation also serves as the explanation of the respective elements of the color conversion definition correction program 210 shown in FIG. 8.

The smoothing processing section 311 of the color conversion definition correction apparatus 300 shown in FIG. 9 corresponds to the smoothing processing section 211 of the color conversion definition correction program 210 shown in FIG. 8 on an application software basis. The smoothing processing section 311 applies to a plurality of L*a*b* values in a profile the above-mentioned smoothing processing for smoothing discontinuity among the L*a*b* values so as to correct the profile. The smoothing processing section 311 is one example of a function of the smoothing processing section referred to in the present invention. The function is implemented, on a hardware basis, by the CPU 811 incorporated into the main frame 81 of the personal computer 80 shown in FIG. 1, FIG. 2, and FIG. 3, which executes the smoothing processing section 211 (cf. FIG. 8) as the program parts.

The reference color set up section 312 corresponds to the reference color set up section 212 of the color conversion definition correction program 210 shown in FIG. 8 on an application software basis. The reference color set up section 312 is for setting up the reference color to the L*a*b* values in the profile. The reference color set up section 312 is adapted, as setting up of the reference color, to receive a selection of data from the L*a*b* values before an application of the smoothing processing by the smoothing processing section 311, and an input of color data representative of the reference color. The reference color set up section 312 is one example of a function of the reference color set up section referred to in the present invention. The function is implemented, on a hardware basis, by the CPU 811 incorporated into the main frame 81 of the personal computer 80 shown in FIG. 1, FIG. 2, and FIG. 3, which executes the reference color set up section 212 (cf. FIG. 8) as the program parts.

The color difference arithmetic operation section 313 corresponds to the color difference arithmetic operation section 213 of the color conversion definition correction program 210 shown in FIG. 8 on an application software basis. The color difference arithmetic operation section 313 is for determining a color difference between the reference color set up by the reference color set up section 312 and a color represented by the L*a*b* values subjected to the smoothing processing by the smoothing processing section 311. The color difference arithmetic operation section 313 is one example of a function of the reference color set up section referred to in the present invention. The function is implemented, on a hardware basis, by the CPU 811 incorporated into the main frame 81 of the personal computer 80 shown in FIG. 1, FIG. 2, and FIG. 3, which executes the color difference arithmetic operation section 213 (cf. FIG. 8) as the program parts.

The reference color difference set up section 314 corresponds to the reference color difference set up section 214 of the color conversion definition correction program 210 shown in FIG. 8 on an application software basis. The reference color difference set up section 314 is for setting up an arbitrary reference color difference. The reference color difference set up section 314 is one example of a function of the reference color difference set up section referred to in the present invention. The function is implemented, on a hardware basis, by the CPU 811 incorporated into the main frame 81 of the personal computer 80 shown in FIG. 1, FIG. 2, and FIG. 3, which executes the reference color difference set up section 214 (cf. FIG. 8) as the program parts.

The color data correction section 315 corresponds to the color data correction section 215 of the color conversion definition correction program 210 shown in FIG. 8 on an application software basis. The color data correction section 315 corrects the L*a*b* values subjected to the smoothing processing by the smoothing processing section 311, when the color difference determined by the color difference arithmetic operation section 313 is larger than the reference color difference set up by the reference color difference set up section 314, in such a manner that a color difference between a color represented by the L*a*b* values and the reference color is small. Details of the correcting way will be described later. The color data correction section 315 is one example of a function of the color data correction section referred to in the present invention. The function is implemented, on a hardware basis, by the CPU 811 incorporated into the main frame 81 of the personal computer 80 shown in FIG. 1, FIG. 2, and FIG. 3, which executes the color data correction section 215 (cf. FIG. 8) as the program parts.

Figure 10:
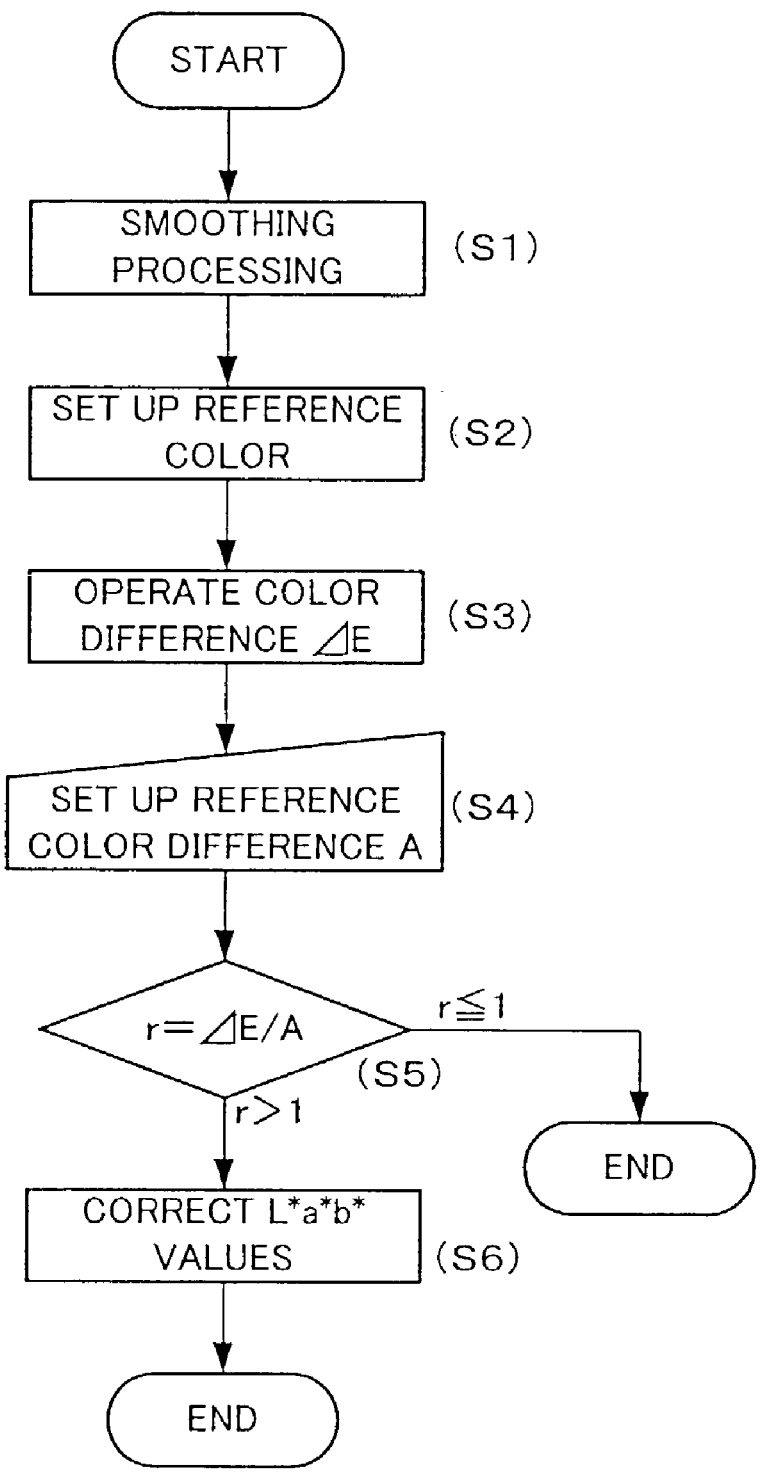
FIG. 10 is a flowchart useful for understanding a processing in a color conversion definition correction apparatus of the present invention.
Figure 11:
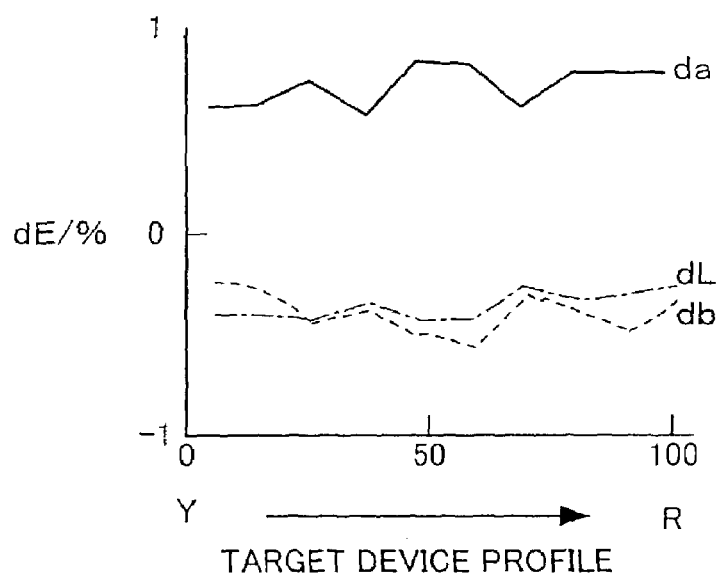
FIG. 11 is a view showing an example of a color conversion definition (a device profile) including noises destroying monotonicity of variations of data.
Figure 12:
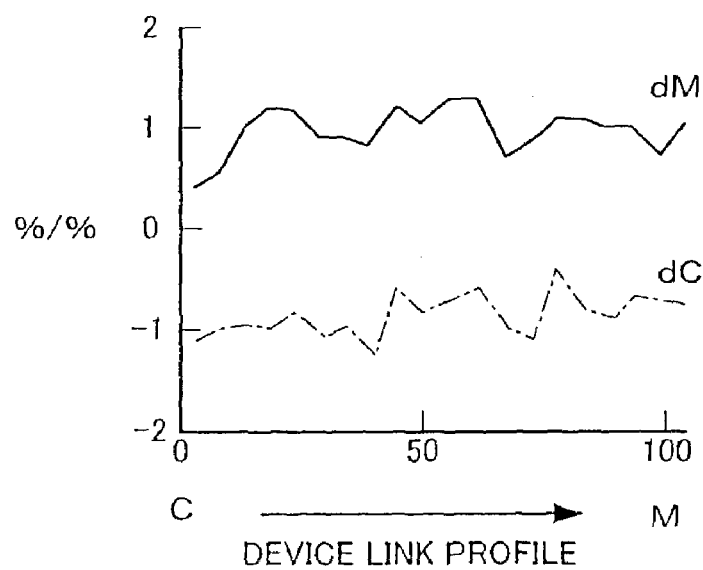
FIG. 12 is a view showing an example of a color conversion definition (a device link profile) including noises destroying monotonicity of variations of data.
Figure 13:
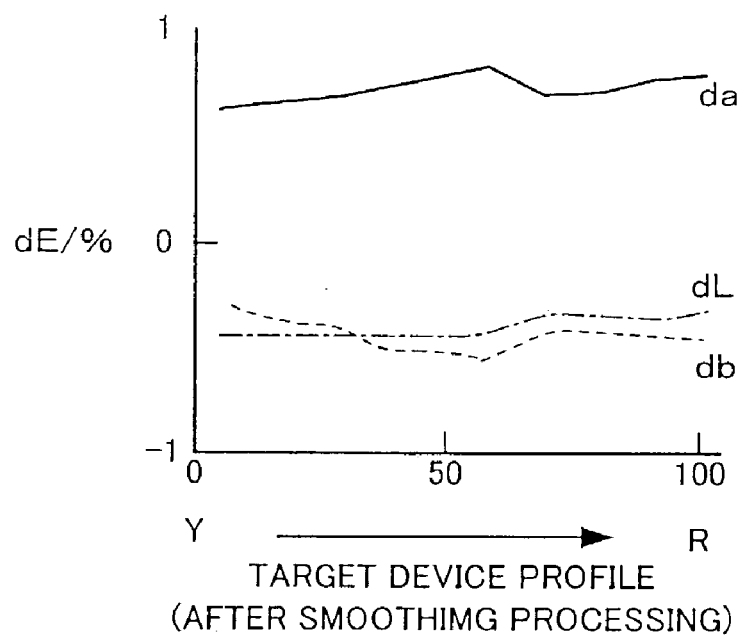
FIG. 13 is a view showing an example of a color conversion definition (a device profile) after the smoothing processing to the color conversion definition (the device profile) shown in FIG. 11.
Figure 14:
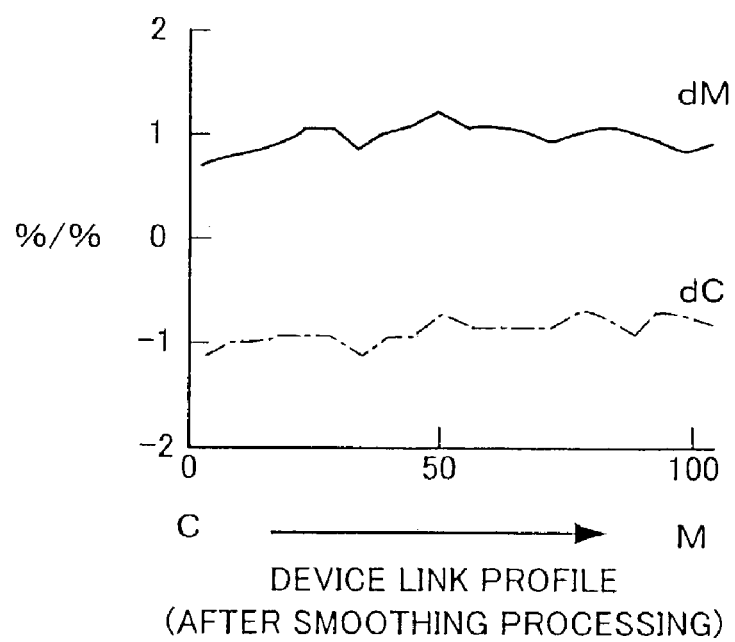
FIG. 14 is a view showing an example of a color conversion definition (a device link profile) after the smoothing processing to the color conversion definition (the device link profile) shown in FIG. 12.

FIG. 10 is a flowchart useful for understanding a processing in a color conversion definition correction apparatus of the present invention.

Here there will be explained an example in which the printer profile 500 is corrected.

The flowchart shown in FIG. 10 comprises a step (step S1) of a smoothing processing, a step (step S2) of setting up a reference color, a step (step S3) of carrying out an operation for a color difference ΔE, a step (step S4) of setting up a reference color difference A, a step (step S5) of comparing the color difference ΔE with the reference color difference A, and a step (step S6) of correcting L*a*b* values. Those steps are processed by the personal computer 80 shown in FIG. 1, FIG. 2, and FIG. 3.

In the step (step S1) of the smoothing processing, the L*a*b* values, which are obtained through the colorimetry by the spectrocolorimeter 70 (cf. FIG. 2) for the color patches constituting the color chart 62 in the printer profile 500 explained referring to FIG. 4 and FIG. 6, and the L*a*b* values, which are obtained through the interpolation operation, are subjected to the smoothing processing for smoothing a discontinuity among the L*a*b* values, so that the printer profile 500 is corrected. The smoothing processing determines the mean value of L*a*b* values of a lattice of interest in the printer profile 500 having the LUT type and L*a*b* values of a lattice of the periphery adjacent to the lattice (first occurrence) as the L*a*b* values of the lattice of interest. When ones in which the L*a*b* values before the application of the smoothing processing are representatively expressed are denoted by (L0, a0, b0), and a function representative of the smoothing processing is denoted by F, ones (L1, a1, b1) in which the L*a*b* values after the application of the smoothing processing are representatively expressed are denoted as follows:

$$L1 = F(L0)$$

$$a1 = F(a0)$$

$$b1 = F(b0)$$

In the step (step S2) of setting up a reference color, there is established a setting up of the reference color to the L*a*b* values, which are obtained through the colorimetry by the spectrocolorimeter 70 (cf. FIG. 2) for the color patches constituting the color chart 62 in the printer profile 500, and the L*a*b* values, which are obtained through the interpolation operation. Here, as the setting up of the reference color, there is established a selection of data from the L*a*b* values (L0, a0, b0) before an application of the smoothing processing at the step (step Si) of the smoothing processing.

Incidentally, as to the step (step S2) of setting up the reference color, there is explained an example in which there is established a selection of data from the L*a*b* values (L0, a0, b0) before an application of the smoothing processing at the step (step S1) of the smoothing processing. However, it is acceptable that there is established an input of color data representative of a color not included in the color chart, for example, a specific skin color and the like. But, hereinafter there will be continued the explanation in conjunction with the example in which there is established the selection of data.

In the step (step S3) of carrying out an operation for the color difference ΔE, there is determined the color difference ΔE between the reference color set up in the step (step S2) of setting up the reference color, that is, a color represented by the L*a*b* values (L0, a0, b0) before an application of the smoothing processing at the step (step S1) of the smoothing processing, and a color represented by the L*a*b* values (L1, a1, b1) after the application of the smoothing processing at the step (step S1) of the smoothing processing. Here, the color difference ΔE is determined by a formula (1) set forth below.

$$\Delta E = \sqrt{(dL \cdot dL + da \cdot da + db \cdot db)} \tag{1}$$

where
dL=L1−L0
da=a1−a0
db=b1−b0

In the step (step S4) of setting up a reference color difference A, there is established a set up for an arbitrary reference color difference A through the keyboard and the mouse provided on the personal computer 80 shown in FIG. 1, FIG. 2, and FIG. 3.

In the step (step 5) of comparing the color difference ΔE with the reference color difference A, the color difference ΔE determined in the step (step S3) of carrying out an operation for the color difference ΔE is compared with the reference color difference A set up in the step (step S4) of setting up a reference color difference A. Here, first, the color difference ΔE and the reference color difference A are used to determine a value r in accordance with a formula (2) as set forth below.

$$r = \Delta E / A \tag{2}$$

where the value r denotes the ratio of the color difference ΔE to the reference color difference A.

Next, a comparison of the color difference ΔE with the reference color difference A is made in accordance with the value of r thus determined. Here, there is carried out a processing, which will be explained hereinafter, sorting out a case where $$r \leq 1$$

that is, the color difference ΔE is equal to or less than the reference color difference A, from a case where $$r > 1$$

that is, the color difference ΔE is larger than the reference color difference A.

In the step (step S6) of correcting L*a*b* values, the L*a*b* values (L1, a1, b1) after the application of the smoothing processing at the step (step S1) of the smoothing processing is corrected, in a case where the color difference ΔE determined in the step (step S3) of carrying out an operation for the color difference ΔE is larger than the reference color difference A set up in the step (step S4) of setting up a reference color difference A, that is, the value of r determined in the formula (2) is expressed by $$r > 1$$

in such a manner that a color difference ΔE between the color represented by the L*a*b* values (L1, a1, b1) and the reference color, that is, the color represented by the L*a*b* values (L0, a0, b0) before an application of the smoothing processing at the step (step S1) of the smoothing processing is small. When ones wherein the corrected L*a*b* values are representatively expressed are denoted by (L1', a1', b1'), the L*a*b* values (L1', a1', b1') are determined in accordance with formulas (3), (4) and (5) as set forth below.

$$L1' = L0 + dL/r \tag{3}$$

$$a1' = a0 + da/r \tag{4}$$

$$b1' = b0 - db/r \tag{5}$$

This correction makes it possible to improve a decrease of a color matching accuracy due to a change of data by the smoothing processing, and thereby maintaining the color matching accuracy based on the reference color difference A and easing a discontinuity of density.

In the event that the color difference ΔE determined in the step (step S3) of carrying out an operation for the color difference ΔE is equal to or less than the reference color difference A set up in the step (step S4) of setting up a reference color difference A, that is, the value of r determined in the formula (2) is expressed by $$r \leq 1,$$

the L*a*b* values (L1, a1, b1) after the application of the smoothing processing at the step (step S1) of the smoothing processing is established as the L*a*b* values of the printer profile 500, without being subjected to the correction explained as to the step (step S6) of correcting L*a*b* values.

As mentioned above, according to the color conversion definition correction apparatus of the present embodiment, and the color conversion definition correction program storage medium storing a color conversion definition correction program which causes a computer to operate as such a color conversion definition correction apparatus, to correct the color conversion definition, the smoothing processing is applied to the L*a*b* values corresponding to an example of the second data referred to in the present invention, and there is obtained a color difference between the reference color set up in accordance with the data selection from the L*a*b* values before an application of the smoothing processing and the color after the application of the smoothing processing. And in the event that this color difference is larger than the reference color difference set up by the reference color difference set up section, the L*a*b* values after the application of the smoothing processing is corrected so that the color difference between the color represented by the L*a*b* values and the reference color becomes small. Thus, according to the color conversion definition correction apparatus of the present embodiment, and the color conversion definition correction program storage medium storing a color conversion definition correction program, it is possible to prevent an accuracy of color matching from being greatly lowered owing to the application of the smoothing processing, and thereby maintaining a predetermined color matching accuracy and easing a discontinuity of density. Therefore, according to the color conversion definition correction apparatus of the present embodiment, it is possible to implement coping with both the color matching accuracy and the continuity of density on a high dimensional basis.

Incidentally, according to the present embodiment, as an example of the smoothing processing section referred to in the present invention, there is raised an example in which the smoothing processing is applied to the profile in its entirety. However, it is acceptable that the smoothing processing section referred to in the present invention applies the smoothing processing to a part of the profile.

Further, according to the flowchart shown in FIG. 10 useful for understanding a processing in a color conversion definition correction apparatus of the present invention, there is raised an example in which the "correction of the color conversion definition" referred to in the present invention is applied to the printer profile. However, the present invention is not restricted to that. It is acceptable that the "correction of the color conversion definition" is applied to, for example, the device link profile created through a combination of the printing profile and the printer profile, or an input device profile such as a profile of a scanner. Alternatively, according to the present invention, it is acceptable that the correction processing is applied to the input device profile and the output device profile, or the correction processing is applied to a device link profile created through a combination of the input device profile and the output device profile after an application of the correction processing.

Furthermore, according to the present embodiment, as an example of the reference color difference set up section referred to in the present invention, there is raised an example in which the reference color difference is evenly set up to the color patches constituting the color chart. However, it is acceptable that the reference color difference set up section referred to in the present invention sets up individually the reference color difference to the color patches constituting the color chart one by one.

Still further, according to the present embodiment, as an example of the color data correction section referred to in the present invention, there is raised an example in which the L*a*b* values (L1', a1', b1') after the correction are determined in accordance with the formulas (3), (4) and (5). However, it is acceptable that the color data correction section referred to in the present invention performs, for example, a filtering through increasing a weighting factor of an evaluation point, determines the weighting factor of an evaluation point so as to be within a target color difference, determines a local filter factor in accordance with the determined weighting factor, and does over again the smoothing using a filter locally different in weight.

As mentioned above, according to the present invention, there is provided a color conversion definition correction apparatus capable of coping with both the color matching accuracy and the continuity of density on a high dimensional basis, and a color conversion definition correction program storage medium storing a color conversion definition correction program which causes a computer to operate as such a color conversion definition correction apparatus.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color conversion definition correction apparatus for correcting a color conversion definition defining a relation between first color data representative of a color by coordinates on a first color space and second color data representative of a color by coordinates on a second color space in such a manner that a plurality of first color data has a one-to-one correspondence with a plurality of second color data, the color conversion definition correction apparatus comprising:

a smoothing processing section that applies to a plurality of second color data in the color conversion definition a smoothing processing for smoothing discontinuity among the plurality of second color data so as to correct the color conversion definition;

a reference color set up section that sets up a reference color to the second color data in the color conversion definition;

a color difference arithmetic operation section that determines a color difference between the reference color set up by the reference color set up section and a color represented by the second color data subjected to the smoothing processing by the smoothing processing section;

a reference color difference set up section that sets up an arbitrary reference color difference according to an operation;

a color data correction section that corrects the second color data subjected to the smoothing processing by the smoothing processing section, when the color difference determined by the color difference arithmetic operation section is larger than the reference color difference set up by the reference color difference set up section, in such a manner that a color difference between a color represented by the second color data and the reference color is small; and wherein:

x denotes a parameter of the corrected second color data, y denotes a parameter of the reference color, z denotes a parameter of the second color data subjected to the smoothing processing by the smoothing processing section, A denotes the reference color difference, and E denotes the color difference determined by the color difference arithmetic operation section, wherein:

$$x=y+((z-y)E/A).$$

2. A color conversion definition correction apparatus according to claim 1, wherein the reference color set up section is adapted, as setting up of the reference color, to receive a selection of data from the second color data before an application of the smoothing processing by the smoothing processing section.

3. A color conversion definition correction apparatus according to claim 1, wherein the reference color set up section is adapted, as setting up of the reference color, to receive an input of color data representative of the reference color.

4. A computer readable storage medium storing a color conversion definition correction program which causes a computer to operate as a color conversion definition correction apparatus for correcting a color conversion definition defining a relation between first color data representative of a color by coordinates on a first color space and second color data representative of a color by coordinates on a second color space in such a manner that a plurality of first color data has a one-to-one correspondence with a plurality of second color data, when the color conversion definition correction is incorporated into the computer and executed, the color conversion definition correction program comprising:

a smoothing processing section that applies to a plurality of second color data in the color conversion definition a smoothing processing for smoothing discontinuity among the plurality of second color data so as to correct the color conversion definition;

a reference color set up section that sets up a reference color to the second color data in the color conversion definition;

a color difference arithmetic operation section that determines a color difference between the reference color set up by the reference color set up section and a color represented by the second color data subjected to the smoothing processing by the smoothing processing section;

a reference color difference set up section that sets up an arbitrary reference color difference according to an operation;

a color data correction section that corrects the second color data subjected to the smoothing processing by the smoothing processing section, when the color difference determined by the color difference arithmetic operation section is larger than the reference color difference set up by the reference color difference set up section, in such a manner that a color difference between a color represented by the second color data and the reference color is small; and wherein:

x denotes a parameter of the corrected second color data, y denotes a parameter of the reference color, z denotes a parameter of the second color data subjected to the smoothing processing by the smoothing processing section, A denotes the reference color difference, and E denotes the color difference determined by the color difference arithmetic operation section, wherein:

$x = y + ((z - y)/E/A)$.

5. A color conversion definition correction apparatus according to claim 1, wherein both the reference color and the second color data subjected to the smoothing processing by the smoothing processing section are defined in a color independent space.

6. A color conversion definition correction apparatus according to claim 1, wherein the correction of the second color data subjected to the smoothing processing by the smoothing processing section is based on a ratio of the color difference determined by the color difference arithmetic operation section and the reference color difference.

7. A color conversion definition correction apparatus according to claim 6, wherein the correction of the second color data subjected to the smoothing occurs automatically in response to the ratio being calculated.

\* \* \* \* \*